(12) United States Patent
Odinokov et al.

(10) Patent No.: US 11,596,958 B2
(45) Date of Patent: Mar. 7, 2023

(54) SPRAYING DEVICE FOR LIQUID MEANS OF CHEMICAL TREATMENT WITH REPLACEABLE LIQUID SUBSYSTEM AND SPRAYING SYSTEMS ON THE BASIS THEREOF

(71) Applicant: ROBOTOPIA UAB, Vilnius (LT)

(72) Inventors: Sergey Odinokov, Vilnius (LT); Linas Samuolis, Vilnius (LT)

(73) Assignee: ROBOTOPIA UAB, Vilnius (LT)

( * ) Notice: Subject to any disclaimer, the term of this patent is extended or adjusted under 35 U.S.C. 154(b) by 385 days.

(21) Appl. No.: 16/652,708

(22) PCT Filed: Aug. 20, 2018

(86) PCT No.: PCT/IB2018/056285
§ 371 (c)(1),
(2) Date: Apr. 1, 2020

(87) PCT Pub. No.: WO2019/073313
PCT Pub. Date: Apr. 18, 2019

(65) Prior Publication Data
US 2020/0316628 A1    Oct. 8, 2020

(30) Foreign Application Priority Data

Oct. 10, 2017  (LT) ...................................... 2017 077

(51) Int. Cl.
*B05B 9/047*    (2006.01)
*B05B 12/00*    (2018.01)
(Continued)

(52) U.S. Cl.
CPC ............ *B05B 9/047* (2013.01); *B05B 12/008* (2013.01); *B05B 13/005* (2013.01);
(Continued)

(58) Field of Classification Search
CPC ..... B05B 9/047; B05B 9/0838; B05B 13/005; B05B 15/65; A01M 7/0042;
(Continued)

(56) References Cited

U.S. PATENT DOCUMENTS

| 2,596,414 A | 5/1952 | Knapp |
| 3,991,758 A | 11/1976 | Mohrke et al. |

(Continued)

FOREIGN PATENT DOCUMENTS

| CA | 2953378 A1 | 1/2016 |
| CN | 101733223 | 6/2010 |

(Continued)

OTHER PUBLICATIONS

Machine Translation of CN 107041355 (Year: 2017).*
(Continued)

*Primary Examiner* — Cody J Lieuwen
(74) *Attorney, Agent, or Firm* — Lowenstein Sandler LLP

(57) ABSTRACT

The invention is intended for the organization of an automated process for spraying of liquid means of chemical treatment from unmanned vehicles, for example, in precise farming systems. The use of a replaceable, marked and hermetically sealed liquid subsystem in the spray device of the invention, along with an integrated self-diagnosis system, using compressed gas energy and a pressure regulator instead of standard pumps, reduces the weight of the spraying device, improves spraying accuracy, ensures personnel safety and accounting of the accumulated life resource of the main units of spraying devices. All this in combination enables to create fully automated spraying systems.

20 Claims, 7 Drawing Sheets

(51) Int. Cl.
  *B05B 13/00* (2006.01)
  *B64C 39/02* (2006.01)
  *B64D 1/18* (2006.01)
  *B64F 1/36* (2017.01)
  *A01M 7/00* (2006.01)

(52) U.S. Cl.
  CPC .............. *B64C 39/024* (2013.01); *B64D 1/18* (2013.01); *B64F 1/36* (2013.01); *A01M 7/005* (2013.01); *A01M 7/0042* (2013.01); *A01M 7/0089* (2013.01); *B64C 2201/027* (2013.01); *B64C 2201/12* (2013.01)

(58) Field of Classification Search
  CPC ...... A01M 7/0089; A01M 7/005–0057; B64C 39/024; B64C 2201/027; B64C 2201/12; B64D 1/18; B64F 1/36
  USPC .......................... 239/171, 323, 327, 328, 600
  See application file for complete search history.

(56) References Cited

U.S. PATENT DOCUMENTS

| | | | |
|---|---|---|---|
| 4,034,896 A * | 7/1977 | Wilson | B05B 9/047 220/721 |
| 5,842,905 A | 12/1998 | Lee et al. | |
| 7,784,715 B2 | 8/2010 | Kress | |
| 2006/0255181 A1 | 11/2006 | Leer et al. | |
| 2010/0205731 A1 * | 8/2010 | Muhlhausen | B05B 12/122 4/223 |
| 2014/0303814 A1 * | 10/2014 | Burema | A01C 21/00 901/1 |
| 2015/0059626 A1 | 3/2015 | Conrad et al. | |
| 2016/0307448 A1 * | 10/2016 | Salnikov | G05D 1/104 |
| 2017/0129605 A1 | 5/2017 | Wu et al. | |
| 2018/0093284 A1 * | 4/2018 | Harris | A01C 23/047 |
| 2018/0118341 A1 * | 5/2018 | Lin | B64C 39/024 |
| 2019/0366375 A1 * | 12/2019 | Thompson | B64C 39/02 |
| 2019/0389577 A1 * | 12/2019 | Jones | G05D 1/0094 |
| 2021/0321601 A1 * | 10/2021 | Ledebuhr | B05B 13/005 |

FOREIGN PATENT DOCUMENTS

| | | | | |
|---|---|---|---|---|
| CN | 105438475 A | | 3/2016 | |
| CN | 105882973 A | | 8/2016 | |
| CN | 106035295 A | | 10/2016 | |
| CN | 205633070 | | 10/2016 | |
| CN | 107041355 A | * | 8/2017 | .......... A01M 7/0085 |

OTHER PUBLICATIONS

Rifai, Ryan, "UN:200,000 die each year from pesticide poisoning"; News/Science & Technology, Mar. 8, 2017, 4 pages, http://www.aljazeera.coni/news/2017/03/200000-die-year-pcsticidepoisoning-170308140641105.html.
International Search Report for PCT/IB2018/056285 dated Nov. 7, 2018, 3 pages.

* cited by examiner

B

SPRAYING DEVICE FOR LIQUID MEANS OF CHEMICAL TREATMENT WITH REPLACEABLE LIQUID SUBSYSTEM AND SPRAYING SYSTEMS ON THE BASIS THEREOF

CROSS-REFERENCE TO RELATED APPLICATION(S)

This application is a national phase of International Application No. PCT/IB2018/056285, filed on Aug. 20, 2018, which claims the benefit of Lithuanian Patent Application No. 2017 077, filed on Oct. 10, 2017. The contents of these applications are hereby incorporated by reference in their entirety.

FIELD OF THE INVENTION

The invention is related to the field of agriculture and forestry, namely to devices for the treatment of agricultural areas, forest lands and other areas by spraying liquid means of chemical treatment, in general by a spraying device, mounted on an unmanned vehicle, particularly on an unmanned aerial vehicle.

The invention is intended for the dosed distribution of liquid means of chemical treatment in precision agriculture systems, including both fertilizers, plant growth stimulators and analogous materials, as well as for combating harmful insects, pests and weeds and plants along roads, pipelines and so on.

BACKGROUND OF THE INVENTION

Sprayed liquids, used in agriculture and other industries, are usually poisonous. Any operation involving such liquids (refilling, spraying, spilling and washing) poses a risk to personnel health, therefore requires special safety measures.

High rate of mortality from pesticides and poisonous substances is typical for the agricultural industry [(http://www.aljazeera.com/news/2017/03/200000-die-year-pesticide-poisoning-170308140641105.html)], which indicates the insufficiency of the existing protective means.

Liquid that is hazardous to the personnel remains in the units of spraying device (in reservoirs, connecting hoses, filters, sprayers, nozzles, liquid pumps and valves).

Known devices for spraying of liquid means of chemical treatment typically comprise a housing; reservoir for liquid means; spraying unit(s) with a sprayer(s); spraying device controller (optionally), liquid transport system, comprising set of liquid hoses and means for ensuring the flow of liquid through the liquid transport system from the reservoir to the spraying unit(s).

One way or another, known solutions often mention a liquid subsystem as an integral part of spraying devices for liquid means of chemical treatment, including those installed in an unmanned vehicle. Generally the liquid subsystem is usually comprising a reservoir for liquid means of chemical treatment, provided with an outlet channel, and a liquid hoses connected thereto. Known spraying devices for unmanned vehicles have a statically assembled structure of significant size (heavy and large in volume), thus complicating the entire system service and compliance with the work safety standards. Existing spraying devices are not capable of self-diagnosis and are of minor use for automated/robotic systems.

Besides, the residual liquid and its vapour over a longer period of time are also harmful to the elements of spraying device and the unmanned vehicle, carrying it.

In part of current technical solutions, liquid splashes freely in a large fixed volume, therefore, as liquid is consumed, this causes the unmanned vehicle to swing due to the shift of centre of gravity.

Current devices do not have an unified standard of reliability for their components and it is not possible to track the service life/resources of components coming into contact with the liquid, therefore they do not provide neither safety nor reliability.

The main component of the spraying device, disclosed in patent application US2017/0129605A1 is based on the use of a pump, and the spraying device is mounted on an unmanned aerial vehicle. Consumption of liquid (flow rate) in the spraying device is set by frequency of pump cycles. A liquid transport system (liquid subsystem) is mentioned in said application, by which liquid is supplied from the reservoir to the sprayers.

The main drawback and problem of this solution is that such a spraying device requires a pump, i.e. a mechanism with considerable weight, and this is essential when mounting on an unmanned vehicle.

Other drawbacks of the technical solution in question are that the spraying device is designed only for an unmanned aerial vehicle and not for use on an unmanned ground vehicle; the fact that the liquid transport system is stationary and cannot be easily removed or entirely replaced with a new one; that personnel contact with the contents of the liquid transport system or residues thereof cannot be avoided when refilling the spraying device or servicing it, and this can be dangerous for the service personnel.

The solution of US2017/0129605A1 does not allow to achieve the mounting and use versatility of spraying device, low weight, high level of safety for the personnel, does not allow to easily replace the liquid subsystem without the participation of a qualified personnel equipped with protective means, and it does not solve the problem of the utilization of used liquid subsystem.

In patent CN106035295A the elastic bag (reservoir) is placed inside a rigid tank and is provided with inlet and outlet channels. The rigid tank limits the maximum expansion of the elastic bag. Constant pressure of the elastic walls of the bag on the liquid partially solves the problem of liquid splashing.

The main disadvantage of the design according to CN106035295A is that the bag is a stationary part of the tank and is non-replaceable. Another drawback is that liquid flows in one direction only from the elastic bag to the sprayers.

By the solution according to CN106035295A versatility of mounting of liquid transport system is not achieved, the problem of the utilization of a used liquid transport system is not solved, high personnel safety level is not reached, and it is not possible to easily replace the entire liquid transport system without the participation of a qualified personnel.

A similar solution is disclosed in patent CN 105882973 A, where an elastic inner bag for pesticides is placed in a container filled with elastic material. At the time of refilling the filler is compressed and, as liquid is consumed (depleted), the filler fills the free spaces in the container, creating an unregulated and inconstant pressure within the bag. The container is provided with an inlet check valve and outlet ball valve.

The design described in CN 105882973 has the same drawbacks as CN106035295A. It can also be added that liquid flow from the container remains uncontrolled, the weight of the device is rather large, and it is not easy to remove pesticide residues therefrom.

Solution of patent CN105438475A points out the importance of maintaining increased pressure for the spraying quality. The liquid is stored in reservoirs and sprayed through a sprayer (spraying unit), and the device is refilled through a special feeding box with a screw cap. Increased pressure required for spraying is created by the pump. The spraying device is mounted on an unmanned aerial vehicle.

The main disadvantages of such a solution are that the refilling of the spraying device is not automated (personnel participation is not excluded), the solution is designed for the spraying device of unmanned aerial vehicle only, and the liquid subsystem is stationary and non-replaceable.

Other drawbacks of this technical solution are that a pump is used for spraying, and this significantly increases the weight of the unmanned aerial vehicle. Despite the use of a pump the method of controlling of sprayed liquid flow is not provided. Liquid is sprayed only one way (through the sprayers) and in one direction only, vertically downwards. Liquid channels in this spraying device are arranged strictly vertically, thus increasing the height of the structure.

Spraying devices operating under the compressed air are disclosed in application US 2006/0255181. The drawback is that air presses directly on the liquid. This means that the spraying device cannot be suitable for all types of liquids.

The disadvantage of this design is that manual or electric air compressor is necessary to increase pressure of the sprayed liquid. Such a compressor is inseparable from the structure of the spraying device, which means that the structure cannot be lightweight and mobile, and would require considerable additional energy for operation.

Other drawbacks are the same as in the aforementioned analogues.

Solutions are known in related technical fields, which enable to spray paint from a disposable balloon under air pressure (for example, U.S. Pat. No. 5,842,905, etc.) or to spray poisonous substances from the reservoir, using an outer balloon with compressed air (for example, U.S. Pat. No. 2,596,414, etc.). In such cases air is also directly pressing the liquid, which means that the spraying device is not suitable for all types of liquids; and the issue of splashing of liquid as it is consumed is also not solved.

These spraying devices are not mobile, and require being directly operated by personnel. Other drawbacks are the same as in the previous analogues.

There are also many known devices and methods of storing the liquid in disposable reservoirs, for example, for hair dyeing (CA2953378A1, etc.), for storing doses of medicines (U.S. Pat. No. 3,991,758, etc.), which are provided with channels for the liquid (liquid subsystem elements).

Publication WO2014160589 (US2014/0303814A1) discloses the use of a spraying system with unmanned aerial vehicles in agriculture and specifies the need of an automated refilling subsystem (refilling module), charging of batteries of the unmanned aerial vehicles, base station for the parking and storage of the unmanned aerial vehicles, as well as the use of software for control system and connection with an unmanned aerial vehicle. The personnel's contact with the content of the liquid subsystem or residues thereof is not solved (not considered).

The technical solution under US2014/0303814A1 does not specify refilling with air, does not provide the refilling of the refilling systems themselves by unmanned vehicles, and does not provide the diagnostics of unmanned vehicles or spraying devices thereof, connected for refilling.

Other drawbacks of said technical solution is that the spraying system is stationary and designed for an unmanned aerial vehicle, it is not used with unmanned ground vehicles, and the liquid subsystem cannot be replaced.

The following definitions are used in the present description:

Session—unmanned motion unit, defining both the spatial distribution of the area to be treated and the parameters of spraying (bandwidth, liquid flow, speed of motion or flight).

DISCLOSURE OF THE INVENTION

Summary of the Invention

The proposed technical solution is intended to solve such a problem as unavoidable personnel's contact with substances, harmful to health, during servicing of spraying systems for liquid means of chemical treatment, for example, during refilling them, washing, drying or replacing reservoirs with means of chemical treatment and other elements. In addition, the minimum weight of the known spraying devices is not guaranteed, and the centre of gravity of the devices is not stable during spraying; the spraying devices are non-standardized, not automated and utilization possibilities thereof are limited. Parts of known devices are non-standardized as well, therefore it is not possible to track the service life of the units, contacting with the liquid, which means that known devices are not safe and are unreliable. After the spraying devices are used and until their utilization hazardous liquid still remains in the units of these devices, which liquid residues are also harmful to the elements of the spraying devices and to the unmanned vehicles, carrying them.

The technical task of this invention is to create a spraying system which would provide:
  light weight and simplicity of the spraying device,
  stability of the centre of gravity, so that the unmanned vehicle could be oriented more precisely in space,
  high reliability and safety of the spraying device to service personnel, and this, at least, requires:
  a standard, easily removable and easily replaceable hermetic liquid subsystem as a separate part of the spraying device;
  self-diagnosis of spraying device;
  automated spraying device refilling in refilling stations and replenishment of the refilling stations from spraying devices.

To solve the listed problems, a complex technical solution is proposed, which comprises the whole set of features and objects, as disclosed in the claims of the invention.

A liquid subsystem for use in a spraying device for liquid means of chemical treatment, mounted on an unmanned vehicle, is comprising a reservoir for liquid means of chemical treatment, provided with an outlet channel, and liquid hoses, connecting to the reservoir. Novel is, that the liquid subsystem according to present invention is designed as an entirely replaceable device wherein the hermetic reservoir is made in the form of a bag, impermeable for a liquid medium, suitable for extruding liquid therefrom under the external overpressure. The liquid subsystem further comprises a manifold with one or more outlet ports, which is connected to the outlet channel of the reservoir through the manifold channel. Each liquid hose of the liquid subsystem at one end is hermetically connected to one of the manifold outlet ports, and at the other end is provided with a lock valve, which is closed in a disconnected state.

According to this invention, the liquid subsystem is further comprising a sealable storage bag. Besides, the liquid subsystem is further comprising a contactless tag. The contactless tag is made as a barcode, two-dimensional code or contactless radio frequency tag.

In one embodiment of the invention the contactless tag is containing read-only information. This read-only information is comprising a unique identifier of the liquid subsystem, and/or date of manufacture, and/or warranty expiry date, and/or designation of compatibility with various liquids, and/or designation of maximum operating pressure, and/or number of provisioned cycles of use.

According to the invention the contactless tag may further contain the variable indicators of the liquid subsystem.

The variable indicators, for example, may comprise an identifier of the used liquid type, and/or the impermeability status of the liquid subsystem, and/or a counter for the cycles of use.

The manifold channel of the liquid subsystem according to present invention is elastic or is provided with an elastic section for being clamped by an outer pinch valve. Besides, the manifold channel is provided with one or more measuring sections for being placed into outer liquid flow sensor(s) and/or liquid presence detector(s). Any of measuring sensors, into which said measuring section is placed, may be ultrasonic, optical, inductive or capacitive.

The liquid subsystem of present invention is further comprising a gasbag, provided with a gas inlet valve, to be filled with compressed gas, where said gasbag has a common surface with the reservoir, capable of transferring the gas pressure in the gasbag to the liquid in the reservoir, where compressed gas is selected from a group comprising of air, nitrogen and carbon dioxide, preferably is compressed air.

The gasbag might be made conjoint with the reservoir to form a joint complex bag, made of a material, impermeable for a liquid media.

Said liquid-impermeable material is selected from a group of chemically inert polymeric materials, comprising single- or multilayer films of thermoplastic polyurethane, silicone, rubber, polyimide, polyethylene, polyamide, preferably is thermoplastic polyurethane.

In one of the preferred embodiments of present invention a special purging check valve is installed on the common surface of the reservoir and the gasbag, wherein said valve prevents passing of liquid from the reservoir into the gasbag, however allows gas to pass from the gasbag into the reservoir. The purging check valve of the liquid subsystem according to the invention is allowing gas to pass only if gas pressure in the gasbag exceeds the pressure of the liquid in the reservoir by a certain threshold value. Said complex bag of liquid subsystem may be made as a double bag, wherein the inner bag is embedded into the outer one, and where the inner bag is the reservoir, while the outer bag is the gasbag.

In one of the preferred embodiments of present invention said complex bag is made of three layers of materials, which are hermetically sealed together around a periphery thereof, wherein the lower bag is the reservoir while the upper bag is the gasbag.

The key object of present invention is a spraying device for liquid means of chemical treatment, designed to be mounted on an unmanned vehicle and comprising a housing, a reservoir for liquid means, spraying unit(s) with sprayer(s), spraying device controller, liquid transport system with a set of hoses, and means for transporting of liquid through the liquid transport system from the reservoir to the spraying unit(s).

Novel is, that in the spraying device of present invention:
the reservoir and the liquid transport system are made in the form of an entirely replaceable liquid subsystem of present invention as defined above;
the means for transporting of liquid from the reservoir to the spraying unit(s) are compressed gas contained in one or more balloons and which is fed into the gasbag, equipped with a gasbag inlet channel, wherein the gasbag is embedded into a basket together with the reservoir of the liquid subsystem and is capable of transferring overpressure thereof to the liquid in the reservoir;
spraying device is further comprising a pressure regulator providing adjustable gas supply from the balloon(s) to the gasbag;
each spraying unit is connected with an appropriate liquid hose of the liquid subsystem of present invention through the hermetic connection port of the lock valve;
spraying device controller is the session controller, which is designed to control the pressure regulator, taking into account the readings of feedback sensors.

The spraying device according to present invention may comprise more than one liquid subsystem disclosed above.

The liquid subsystem of the invention is fixed in the nodes of spraying device (A) with the possibility of quick installation, dismantling and/or replacement thereof.

The spraying device of present invention is provided with one or more liquid refilling valves, each being connected to an appropriate liquid hose of the liquid subsystem, and which is designed for refilling the liquid subsystem with liquid means of chemical treatment.

In one of preferred embodiments of present invention the spraying device for liquid means of chemical treatment is provided with one or more gasbag refilling valves, designed for refilling the balloon(s) with compressed gas.

The spraying device according to present invention might be equipped with one or more combined refilling ports, each combining one gasbag refilling valve and one liquid refilling valve. The combined refilling port is designed for automated refilling and/or emptying of the spraying device.

The pressure regulator of the spraying device according to present invention is provided with:
one or more inlet valves connecting the balloon with the gasbag inlet port;
one or more outlet valves connecting the gasbag inlet port with the atmosphere.

In the variant of embodiment of present invention one of the outlet valves of spraying device is a manual outlet valve for use when replacing the liquid subsystem.

The spraying device of the invention is equipped with a central pinch valve.

The spraying device is equipped with one or more purging valves which are designed for passing gas from the balloon(s) into the liquid subsystem in order to purge and dry it, and which are connected to the corresponding liquid hoses of the liquid subsystem, described above.

Each spraying unit of spraying device is provided with a lock valve actuator.

Any spraying unit might comprise one or more sprayer(s).

Any sprayer of the spraying unit might be of siphon, centrifugal or disk type, be an airless type nozzle or is an air-assisted nozzle.

The feedback sensors of the spraying device according to present invention are comprising at least liquid pressure sensor(s) in the reservoir. The feedback sensors might further comprise liquid flow sensor(s), liquid presence detector(s), balloon pressure sensor(s), gasbag pressure sensor(s) and barometer(s).

The session controller of spraying device according to present invention is a microprocessor based device. The session controller is designed to regulate pressure of a liquid in the reservoir according to the continuously calculated sequence of short-term triggerings of inlet and outlet valves. Besides, the session controller is designed to check the hermetic state and/or operability of the main units of the spraying device.

The spraying device according to present invention is provided with a liquid subsystem's contactless tag reader, which is connected to the session controller.

The spraying device is equipped with a communication channel(s), over which the session controller is interacting with the motion controller of the unmanned vehicle.

The unmanned vehicle is serving as an energy source for the session controller of the spraying device of present invention. The energy supplied to the session controller from the unmanned vehicle is serving also as an energy for powering other elements of spraying device.

The entire housing of the disclosed spraying device or part thereof is designed to serve as the basket. The basket might be equipped with a hinged or removable lid.

In one of the embodiments of present invention housing or frame of the unmanned vehicle is serving as the housing of the spraying device. The housing is comprising trusses/masts, onto which spraying units and optionally other components of spraying device are installed, wherein trusses/masts are made static, telescopic or foldable.

In the preferred embodiment of the present invention the spraying device is made in the form of a module designed to be installed on an unmanned vehicle. The spraying device is made as said module designed for automated installation, removal or replacement on an unmanned vehicle.

The gasbag in the variant of embodiment of present invention is part of the liquid subsystem, disclosed above. Compressed gas is selected from a group, comprising of air, nitrogen and carbon dioxide, preferably is compressed air.

According to the invention in a spraying systems of liquid means of chemical treatment, wherein spraying systems comprise one or more unmanned vehicles with mounted spraying devices, a complex of one or more ground stations for automated refilling of spraying devices, mounted on an unmanned vehicle, and a control station, controlling said complex of ground stations and motion of unmanned vehicle(s), the disclosed above spraying device(s) are used. Said complex of ground stations is comprising a station(s) equipped at least with:
  landing module, designed for reliable positioning therein of an unpowered unmanned vehicle(s), and
  refilling module, which is connected to the compressed gas source(s) and liquid source, and which is designed for the automated refilling of said spraying device, mounted on an unmanned vehicle, located in the landing module, with both compressed gas and sprayable liquid by connecting to the gasbag refilling valve and liquid refilling valve.

The unmanned vehicle of the spraying systems of liquid means according to the invention may be equipped with more than one spraying device(s).

The refilling module of the spraying systems of liquid means may be connected to one or more liquid sources.

Any liquid source connected to the refilling module may be either stationary or mobile.

In one of the embodiments of present invention the refilling module of the spraying systems of liquid means is designed to be able to empty the reservoir of the connected spraying device into one of the liquid sources.

The ground stations of spraying systems of liquid means according to present invention are of a modular design, and, besides said landing and refilling modules, the set of modules is further comprising at least:
  power supply module, designed to supply power to other station modules;
  ground station control module, designed to be able to contact with the control station and unmanned vehicles by the communication module;
  spraying device module, designed for the automated installation, dismantling and replacement of spraying device on an unmanned vehicle(s) and for storage of spraying devices;
  chassis, designed for installation of ground station modules thereon.

The spraying systems of liquid means according to present is further comprising an emergency platform for parking, storage and maintenance of faulty unmanned vehicles.

In the preferred embodiment of present invention the unmanned vehicle of the spraying systems of liquid means is an unmanned aerial vehicle.

BRIEF DESCRIPTION OF DRAWINGS

The essential features of the proposed technical solution are explained in drawings which illustrate examples of the embodiments of the invention.

MODES OF EMBODIMENTS OF THE INVENTION (STATICS DESCRIPTION)

Figure 1:
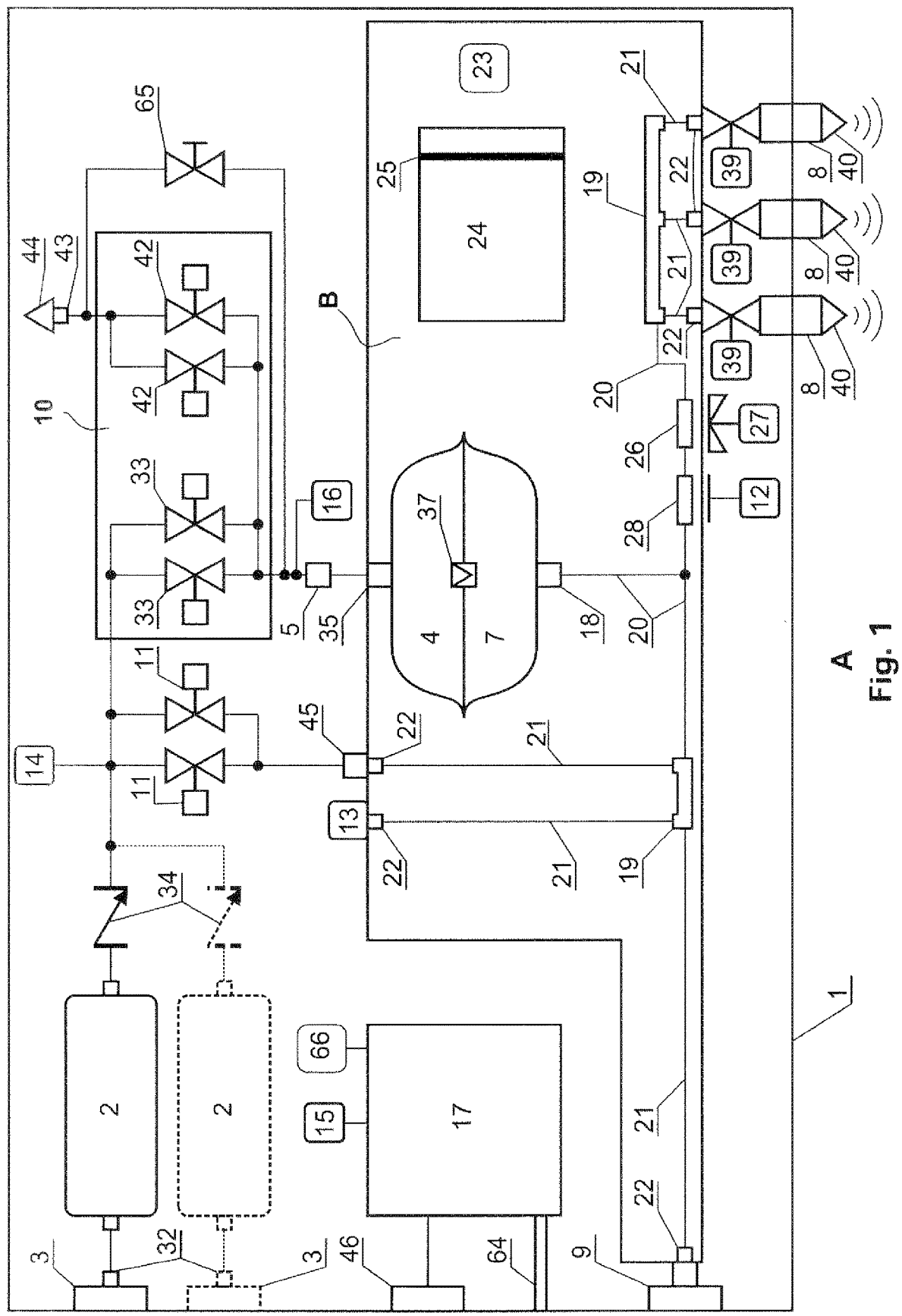
FIG. 1 shows the principal scheme of a spraying device A with a replaceable liquid subsystem B according to present invention, applying a complex bag P.

The variants of embodiments of invention are disclosed as examples illustrating this invention, however not limiting its scope of protection.

The key element of spraying system E according to present invention is a spraying device A for liquid means of chemical treatment with a replaceable liquid subsystem B, which is an integral part of spraying device A. Said invention objects: liquid subsystem B, spraying device A and spraying system E are all designated for spraying of liquid means of chemical treatment and are united by a single inventive concept, which includes the creation of entirely replaceable, properly marked and hermetically sealed liquid subsystem in a spraying device along with the installed self-diagnosis means and the use of compressed gas energy, as well as a pressure regulator instead of standard pumps, for the spraying system, using unmanned vehicles. Moreover, said objects are organically interrelated and correlate as a part (liquid subsystem B), integrated into the whole (spraying device A) and, in turn, integrated into the system (spraying system E), comprising the spraying device as an integral part thereof.

Spraying device A of spraying system E is to be considered first.

In the example of the embodiment of the invention (FIG. 1) provided below, where air is used as a compressed gas, spraying device A comprises:
one or several liquid subsystems B,
housing 1,
compressed gas balloon 2 with gasbag refilling valve 3,
gasbag 4,
gasbag inlet port 5,
basket 6 designed for storing reservoir 7 of gasbag 4 and liquid subsystem B,
one or more spraying units 8,
liquid refilling valve 9,
pressure regulator 10,
one or more purging valves 11,
feedback sensors, including liquid flow sensor or liquid presence detector 12, liquid pressure sensor 13, balloon pressure sensor 14, barometer 15, gasbag pressure sensor 16;
session controller 17.

As indicated above, liquid subsystem B is an integral part of the spraying device A (FIG. 1).

Figure 2A:
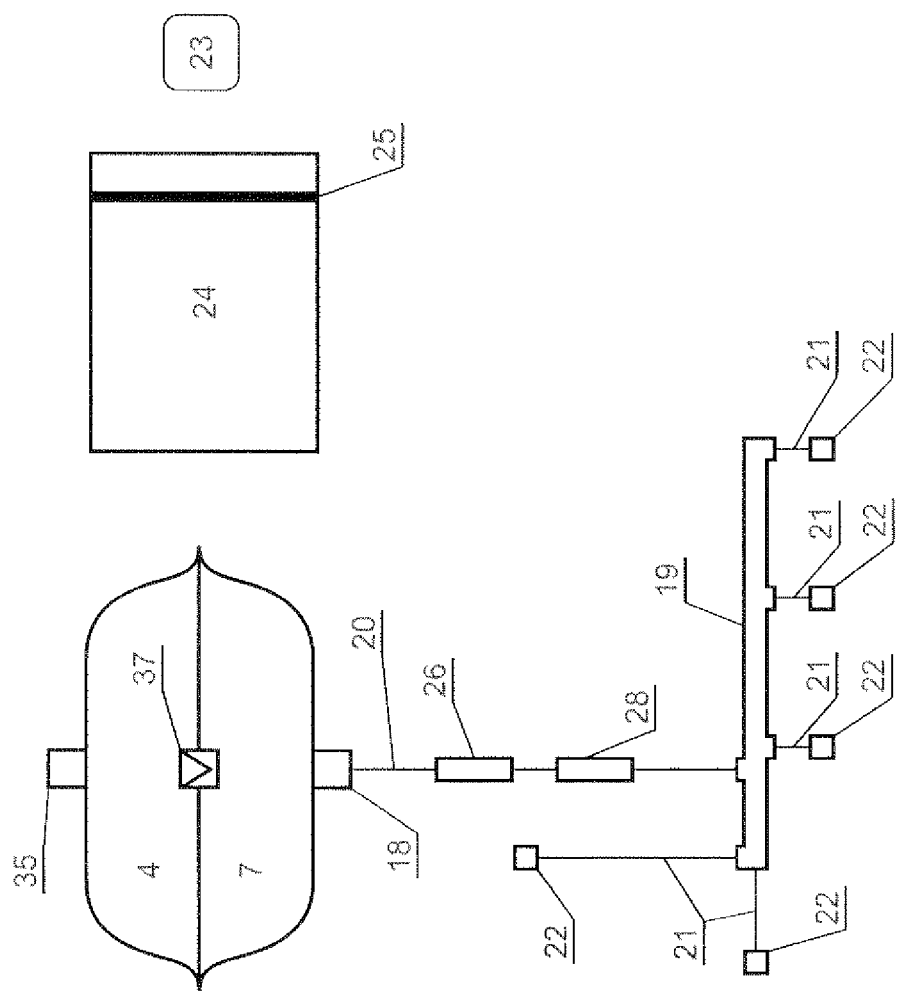
FIG. 2 shows the main variants of a liquid subsystem B according to present invention with a single manifold (a) and a composite manifold (b) in an embodiment with a complex bag P.
Figure 2B:
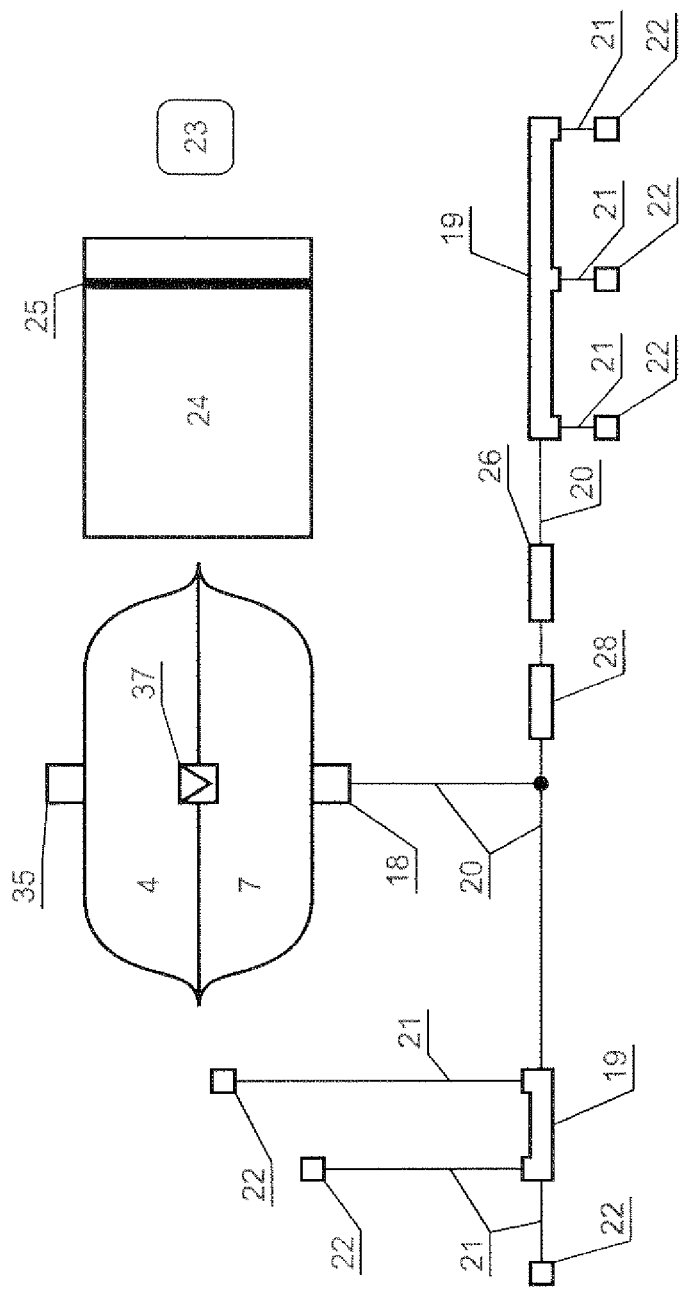

Liquid subsystem B (FIG. 1, FIG. 2a, FIG. 2b) comprises:
reservoir 7 which is made as a hermetic bag from a liquid impermeable plastic (conventional, reinforced or laminated), and provided with outlet channel 18 in the lower part thereof
manifold 19 with one or more ports, which is connected to reservoir outlet channel 18;
manifold channel 20, connecting manifold 19 with reservoir outlet channel 18;
liquid hoses of defined length. Each liquid hose 21 at one end is hermetically connected to one of manifold 19 ports, and at the other end is provided with special lock valve 22, which is liquid impermeable for medium from subsystem B, when the subsystem is disconnected from spraying device A;
contactless tag 23 which identifies liquid subsystem B. The contactless tag can be applied on any element of liquid subsystem B, where the tag would be readable;
storage bag 24, in which the entirely replaceable liquid subsystem B is supplied and utilized after use.

Storage bag 24 is provided with a hermetic lock 25 (which is, for example, zip lock, double zip lock or a structure of analogous purpose).

Manifold channel 20 can be elastic or can be provided with an elastic section 26 to be completely clamped by an outer pinch valve 27.

Manifold channel 20 can be provided with a measuring section 28 for being placed into the outer liquid flow sensors or liquid presence detectors 12. Measuring section 28 can be transparent.

Storage bag 24 can be made of any soft material, which is inert to water and used liquids, for example, polyethylenes: PE (polyethylene), LDPE (low density polyethylene), HDPE (high density polyethylene); polypropylenes: OPP (oriented polypropylene), CPP (cast polypropylene); polyimide PI and analogous materials, including metallized options. Sealable storage bags are massively produced from these materials and they are available to general use.

Liquid hoses 21 are standard plastic hoses/tubes made from a soft material which is inert to water and used liquids, and are designed to operate under increased pressure conditions; for example, those made from polyurethane: PU (polyurethane), soft polyurethane, hard polyurethane, from nylon: nylon (soft nylon), from polymers (FEP (Fluoropolymer)), from silicon.

Elastic section of the manifold channel 26 is also a hose/tube made from elastic material which is inert to water and used liquids, and which is designed to operate under increased pressure conditions. For example, this can be a silicone hose, neoprene hose, BTP (butyl titanate) polymer hose, Tygon® polymer hose and hoses made from analogous materials.

Contactless tag 23 can be of any type suitable for non-contact automated reading, such as a barcode (for example, CODE128), 2D code (for example, QR code or Data matrix), RFID (for example, NFC). Contactless tag 23 may have a rewritable memory for the autonomous storage of the operational history of liquid subsystem B (number of sessions, time under pressure and similar counters).

Liquid subsystem B can be easily separated and dismantled from spraying device A. Liquid subsystem B is fixed:
in basket 6, and/or
at spraying device housing 1 and/or
in operational units (nodes) of spraying device A, for example, in spraying units 8.

Spraying device A can be provided with one or more liquid subsystems B.

If there are more than one liquid subsystems B, then usually the subsystems are provided with separate liquid refilling valves 9, and independent sets of spraying units 8 are connected to manifolds 19 of the liquid subsystems. These liquid subsystems B are controlled by a multichannel session controller 17 through separate channels. Usually one of several liquid subsystems B is the main one, and it is namely its reservoir 7, where pressure is controlled. Other subsystems are considered to be secondary ones, and spraying units 8 connected with them are to be set to the operational pressure of the main liquid subsystem. Secondary liquid subsystems B usually have reservoirs 7 of considerably less volume.

Housing 1 of spraying device A is a rigid structure where all or some elements of the spraying device A are installed.

Figure 4A:
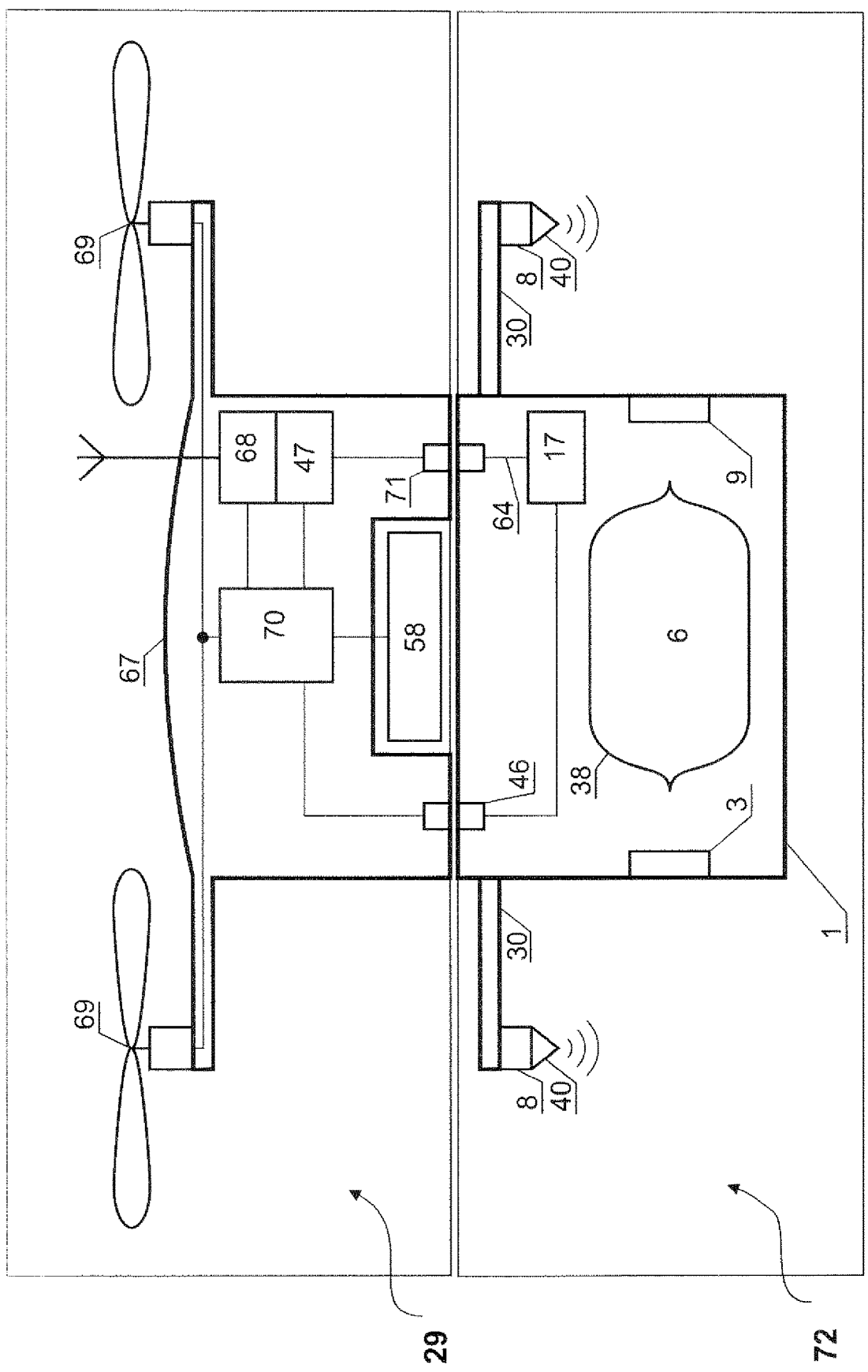
FIG. 4 shows an example of the arrangement of elements of spraying device A (without detailed specification of device A) on an unmanned vehicle (4*a*), in particular on an unmanned aerial vehicle, and the elements of combined refilling port (4*b*).

Housing 1 is installed on the unmanned vehicle 29 (for example, on an unmanned aerial vehicle, FIG. 4) and is carried by it. Part or the whole housing or frame of unmanned vehicle 29 can serve as housing 1.

Housing 1 comprises static, telescopic or folding trusses or masts 30 onto which spraying units 8 and optionally other elements of the device are installed.

Figure 5:
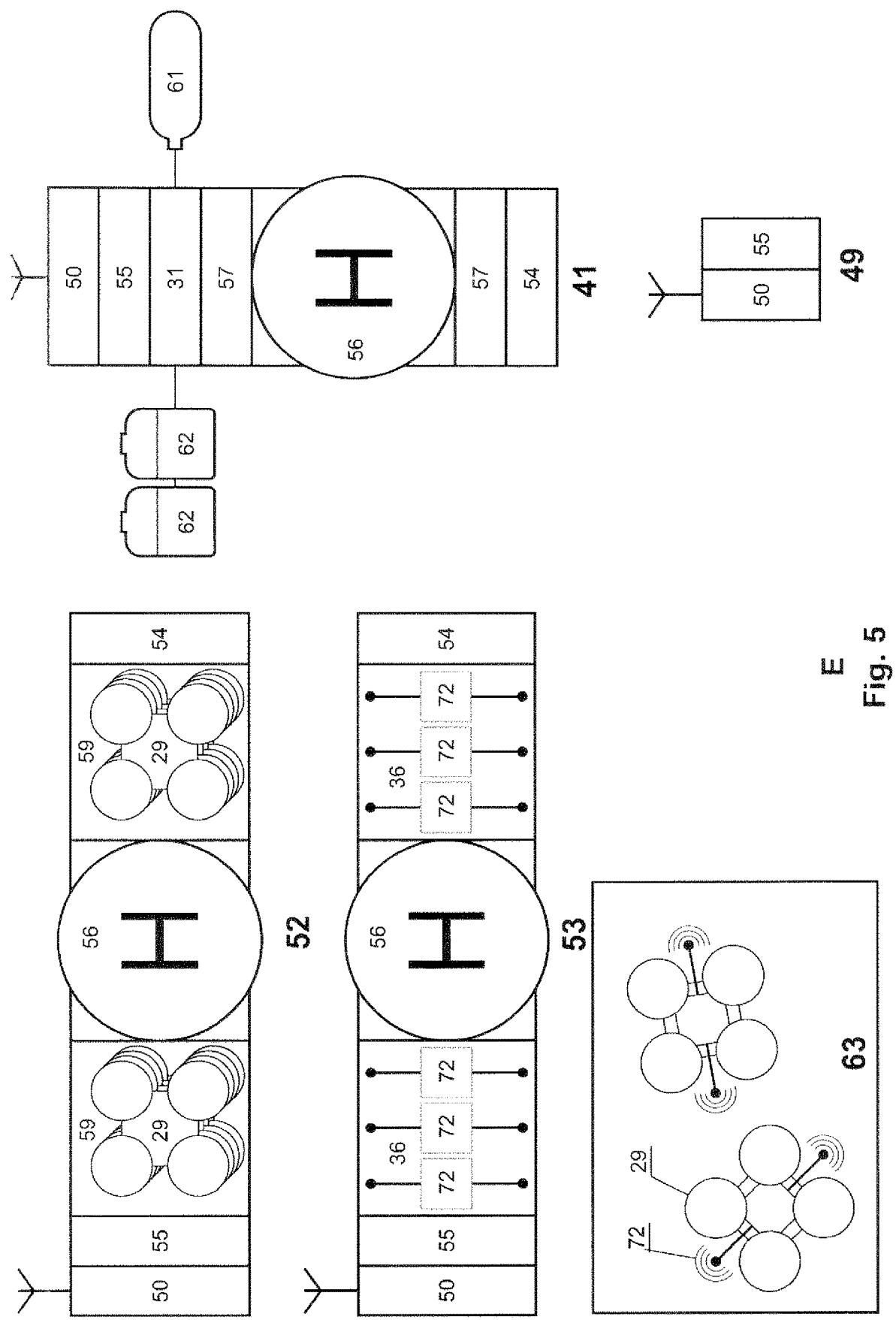
FIG. 5 shows the arrangement and structure of ground station of spraying system E according to present invention.

Spraying devices A, where part of the whole of housing of unmanned vehicle 29 is serving as housing 1, are considered to be partly or fully integrated into the unmanned vehicle 29. Spraying devices A with an independent housing 1 are independent. Independent spraying devices A made in the form of modules, as modular spraying devices A 72, can be installed on unmanned vehicles 29 and removed therefrom in completely automated way by the ground station spraying device module 36. An example of installation of a spraying device as an independent module as shown on FIG. 5 is not excluding other variants of installation of device A on an unmanned vehicle. Independent spraying devices A can be refilled with gas and liquid in an automated way by the ground station refilling module 31.

Gasbag refilling valve 3 can be installed directly on a balloon 2 (FIG. 1) or can be connected to it with a gas refilling valve hose 32 and installed on the housing 1.

Free cavities of housing 1 of spraying device A or of unmanned vehicle 29 can serve as a balloon 2.

Plastic bag embedded into a special basket, which is reinforcing the bag and limiting its maximum volume upon expansion, can serve as a balloon 2.

Spraying device A can be provided with more than one balloon 2 with one joint or several independent gasbag refilling valves 3 (FIG. 1). Each such additional balloon 2 can be connected through the balloon check valve 34 to the inlet of inlet valves 33 and/or purging valves 11.

Gasbag 4 is a hermetic bag made from a liquid impermeable plastic (conventional, reinforced or laminated), which upper part is provided with a gas inlet channel 35.

The volume of a maximally inflated gasbag 4 should not be less than the volume of basket 6.

Gasbag 4 is connected to the gasbag inlet port 5 through the gasbag inlet channel 35.

Reservoir 7 and gasbag 4 can be combined into a single complex bag P.

Figure 3:
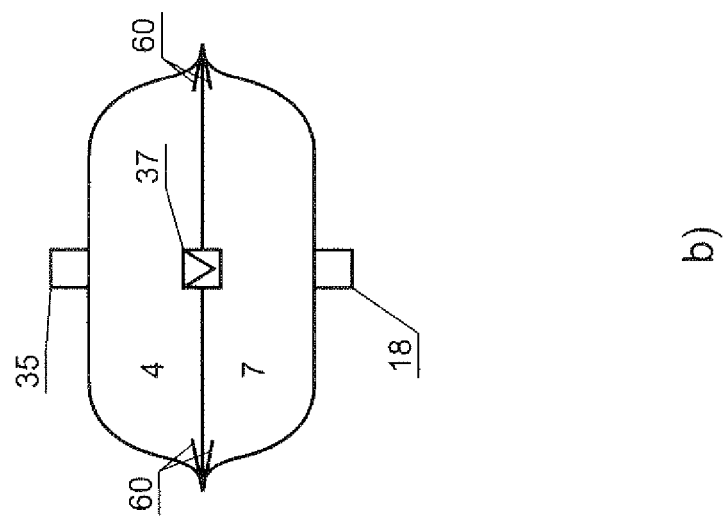
FIG. 3 shows the main embodiments of complex bag P according to present invention, including a double bag with an inserted reservoir (a) and a double sandwich bag (b).
Figure 3:
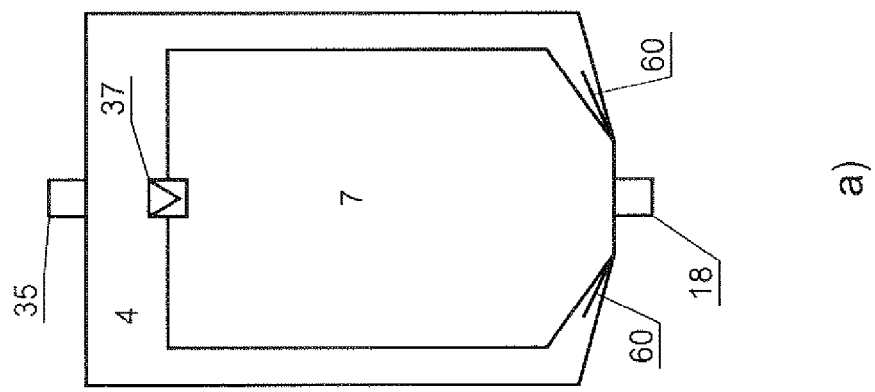

Complex bag P can be of two types (FIG. 3 *a, b*): where the inner bag is embedded into the outer bag, and where design resembles a sandwich, as it is comprised of three layers hermetically sealed together around a perifery thereof. In the latter case the upper and middle layers comprise the upper bag, and the middle and lower layers comprise the lower bag.

The inner (or lower) bag comprises reservoir 7, which is hermetically separated from gasbag 4 with its walls (or its surface). The reservoir outlet channel 18 is located at the bottom of complex bag P (in the lower part).

The outer (or upper) bag comprises gasbag 4, which is hermetically separated from reservoir 7 with walls (or surface) of reservoir 7. Gasbag inlet channel 35 is on the outer (or upper) surface of complex bag P.

Special purging check valve 37 can be installed on the mutual surface of reservoir 7 and gasbag 4, which valve prevents passing of liquid from reservoir 7 to gasbag 4, however allows gas to pass from gasbag 4 to reservoir 7, if pressure difference between them exceeds the defined value (for example, 1 bar).

Such purging check valve 37 ensures both the passive automatic purging, cleaning and drying of liquid subsystem B after liquid is depleted in reservoir 7, and the removal of condensate from gasbag 4.

Stress release leaves 60, which reduce the risk of fracture of complex bag P material in connection points, can be placed on both sides of the inner part of connection perimeter of reservoir 7 and gasbag 4.

Reservoir 7 and gasbag 4 is a bag(s) made from soft air-impermeable and water-impermeable material which is insensitive to water and used liquids, for example, it can be a film made of thermoplastic polyurethane TPU. Other materials can also be used: silicone, rubber, polyimide, polyethylene.

The structurally strong basket 6 (FIG. 1) is designed for gasbag 4 and reservoir 7, and reliably limits the maximum permissible volume of gasbag 4 and reservoir 7. To reduce the weight of spraying device A, basket 6 can be of a porous structure (grid, combs, net of woven or glued carbon filaments), and optionally with inner case, made of a light, strong and non-strechable material.

Basket 6 is adapted for quick insertion of both the reservoir 7 and gasbag 4 into it. For this purpose, it is equipped with a lid 38, which can be hinged or removable.

Gas inlet channel 35 and manifold channel 20 come out of basket 6.

The inner case of basket 6 is made from a light, strong and non-streachable material, for example, from fabric of ripstop nylon, ripstop polyester type, laminate of cuben fiber (CTF3) type or plastic film from polyimide (PI).

There may be one or more spraying units 8, where each spraying unit 8 is provided with:
- a special port for hermetically connecting the lock valve 22 of liquid hose 21,
- an optional lock valve actuator 39 device with an electric (electric motor, electric motor with a reducer, solenoid/electromagnet, device on the base of alloys with memory, etc.) or pneumatic actuator. Lock valve actuator 39 device is not necessary, if central pinch valve 27 is used in spraying device A;
- sprayer 40, which can be an airless type nozzle, an air channel nozzle, centrifugal sprayers, etc.

Liquid refilling valve 9 is connected to manifold 19 with liquid hose 21.

The status of liquid refilling valve 9 is controlled by the refilling station 41. When liquid refilling valve 9 is disconnected from the refilling station 41, it does not pass neither gas nor liquid in any direction.

Pinch valve 27 clamps the elastic section of manifold channel 26. Lock valve 22 control is not necessary in spraying device A with pinch valve 27, and lock valves 22 can be opened mechanically, when connecting to spraying units 8.

Pressure regulator 10 (FIG. 1) is comprised of:
- one or more inlet valves 33, connected in parallel and connecting balloon 2 with gasbag inlet port 5,
- one or more outlet valves 42, connected in parallel and connecting gasbag inlet port 5 with the atmosphere. One of these valves is a manual outlet valve 65, which is used when replacing liquid subsystem B. The outlets of the outlet valves 42 are connected to atmosphere port 43.

Spraying device A can be provided with a silencer 44, which is connected to atmosphere port 43. Spraying device A can be provided with one or more purging valves 11 connected in parallel. Outlets of purging valves 11 are connected to the purging port 45.

Session controller 17 is a microprocessor based device.

Session controller 17 is designed to be able to receive power from unmanned vehicle 29 through the session controller power supply port 46, as well as supply power to all elements of spraying device A which require power.

Session controller 17 can be combined with unmanned vehicle motion controller 47 (FIG. 4*a*) or can be integrated into it.

Figure 4B:
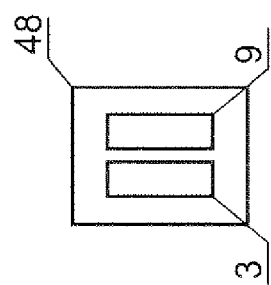

Gasbag refilling valve 3 and liquid refilling valve 9 can be constructively combined with each other in one combined refilling port 48 (FIG. 4*b*).

Unmanned vehicles equipped with spraying devices A can operate in groups in the spraying system E according to present invention, comprising the ground stations park and the control station, fully automatically.

Control station 49 of spraying system E (FIG. 5) is designed for the centralized automatic control of a group of unmanned vehicles 29 and the park of ground stations. Communication module 50 provides communication between control station 49, unmanned vehicles 29 and the ground stations.

Ground stations of spraying system E are designed for automatic servicing of unpowered unmanned vehicles 29 and spraying devices A, integrated into them or carried by them.

Ground stations are composed of modules, where various module combinations are possible to obtain a ground station optimized for specific application, i.e. to obtain a ground station with defined functions, such as refilling station 41, parking station 52, and storage station 53.

The main ground station modules of spraying system E (FIG. 5) are as follows:
- power supply module 54 with the power bus of other station modules,
- ground station control module 55, which is autonomous and is controlled by control station 49. Ground station control module 55 comprises a communication module 50 to contact with the control station 49 and unmanned vehicles 29,
- landing module 56, where unmanned vehicle 29 completes its movement, being properly positioned and fixed to perform the necessary subsequent operations, which will be carried out by other ground station modules,
- batteries module 57, designed for the automated storage, replacement and/or charging of batteries 58 of unmanned vehicles 29,
- unmanned vehicles module 59, designed for secure and compact automated storage of unmanned vehicles 29,
- spraying device module 36, designed for secure and compact automated storage of independent spraying devices A, as well as automated installation thereof on unmanned vehicles 29,
- refilling module 31, designed for the automated refilling of spraying devices A or 36 with compressed gas and liquid, where the module is connected to gasbag refilling valve 3 and liquid refilling valve 9 of the spraying device A, fixed in landing module 56 of unmanned vehicle 29 and connected to the compressed gas source 61 and liquid source 62, where refilling module 31 can also empty the liquid from faulty spraying devices A and check the authenticity of spraying devices A;
- chassis M (not shown in the drawings) on which ground station modules are installed.

Refilling station 41 is designed for the automatic refilling of spraying devices A and charging or replacement of batteries 58 of unmanned vehicle 29.

Main elements of refilling station 41 are as follows:
- power supply module 54,
- landing module 56,
- batteries module 57,
- refilling module 31,
- compressed gas source 61,
- liquid source 62,
- chassis M.

Parking station 52 is designed for secure and automatic storage of unmanned vehicles 29 and can be used for transporting unmanned vehicles 29.

Main elements of the parking station 52 are as follows:
- power supply module 54,
- landing module 56,
- unmanned vehicles module 59,
- chassis M.

Storage station 53 is designed for the automated storage of spraying devices A or 36, made as separate units, and can be used for transporting spraying devices A. Storage station 53 should comprise the following:
- power supply module 54,
- landing module 56,
- spraying device module 36,
- chassis M.

Emergency platform 63 is designed for parking of unmanned vehicles 29, when the unmanned vehicle 29 itself is damaged or spraying device A integrated therein is critically damaged, or when spraying device module 36 is not suitable for automated servicing in ground stations.

Spraying Device and System Operation

Installation of a new liquid subsystem into the spraying device Liquid subsystem B is to be installed into spraying device A. For that purpose a new storage bag 24 is opened and a new liquid subsystem B stored therein is extracted.

Then the lid of basket 6 is opened and reservoir 7 (or complex bag P) is placed into the basket. Manifold channel 20 and gasbag inlet channel 35 are output from the basket 6. If complex bag P is used, gasbag 4 inlet is connected to gasbag inlet port 5. Lid 38 of basket 6 is closed.

Manifold 19 and manifold channel 20 are fixed onto housing 1. Measuring section of manifold channel 28 is placed into the liquid flow sensor and/or liquid presence detector 12. Elastic section of manifold channel 26 is embedded in the pinch valve 27. Liquid hoses 21 are then installed and fixed. One appropriate liquid hose 21 is connected to liquid refilling valve 9. Liquid refilling valve 9 is fixed onto housing 1 of spraying device A, if it is included in the liquid subsystem B set. Other appropriate liquid hose 21 is connected to liquid pressure sensor 13 in reservoir 7. The next liquid hose 21 is connected to purging port 45 of purging valve 11. Lock valves 22 of remaining liquid hoses 21 are then connected with spraying units 8.

Prepared spraying device A can be installed on an unmanned vehicle 29 or in a free slot of storage station 53.

Liquid Spraying

Operation of spraying system E is comprised of many refilling-flying-spraying-returning cycles, also known as sessions. Dynamic formation of sequence of sessions according to the weather conditions and the conditions of unmanned vehicle 29 park and ground stations, as well as control of ground stations and unmanned vehicles 29, are handled by the control station 49.

The session is calculated at control station 49, and session data is loaded in session controller 17 during refilling in refilling station 41 or in refilling module 31 of another ground station.

Session data includes such spatial parameters, as:
- description of zones (bands) for spraying,
- description of routes of unmanned vehicle 29 to the zones, above the zones and between the zones, and description of the return route,
- description of spraying parameters above the zones (for example, bandwidth).

Session data includes such space and time parameters (stages), as:
- refilling in the refilling module 31,
- delivery of liquid to the spraying area,
- spraying parameters (time, liquid flow, flight speed),
- return of unmanned vehicle 29 to refilling module 31 or to unmanned vehicle module 59 through the spraying device module 36, or to emergency platform 63.

During a single session unmanned vehicle 29 can spray several different liquids. For this purpose spraying device A may comprise more than one liquid subsystem B (such liquid subsystems B are usually provided with independent liquid refilling valves 9 and independent sets of spraying units 8), or there may be several spraying devices A.

During refilling at the refilling station 41 or refilling module 31 the session controller 17 receives a session description from control station 49, stores this session description in its memory and then tracks the stages of the session and the current status of the session.

Session controller 17 coordinates and synchronizes the movement of unmanned vehicle 29 with the stages of the session and operations necessary during the session, interacting with motion controller 47 of unmanned vehicle 29 over the communication channel 64.

Session controller 17 manages spraying device A by controlling the sequence of executable commands for pressure regulator 10 and valves of spraying device A. By controlling pressure regulator 10 the session controller 17 regulates liquid flow by correcting calculations according to the feedback parameters received from liquid pressure sensor 13 and/or liquid flow sensor 12. The calculations may also take into account the readings of balloon pressure sensor 14, the readings of gasbag pressure sensor 16 and the readings of barometer 15.

During spraying the liquid flow is regulated by the pressure in gasbag 4 and, due to the limited volume of basket 6, by the pressure in reservoir 7.

Pressure in gasbag 4 is regulated continuously by the session controller 17, calculating sequence of short-term triggerrings of inlet valves 33 and, if necessary, outlet valves 42, taking into account feedback regarding pressure of a liquid in reservoir 7 and/or liquid flow rate and the dynamics of changes of gas pressure in balloon 2, the atmosphere and gasbag 4.

Interruptions necessary during spraying are carried out by controlling lock valves 22 of spraying units 8 or the central pinch valve 27.

Operating pressure in reservoir 7 is always above atmospheric pressure (being usually equal to 3 atm).

The moment of liquid depletion can be determined:
according to liquid flow sensor and/or liquid presence detector 12, and/or
according to the absence of the change of pressure in gasbag 4, i.e. according to gasbag pressure sensor 16, when pressure in reservoir 7 drops below the operating pressure, i.e. according to liquid pressure sensor 13.

Purging and Drying of Liquid Subsystem

At the end of the spraying stage we have an inflated gasbag 4, completely occupying the inner volume of basket 6, an empty and compressed reservoir 7; all valves: inlet valves 33, outlet valves 42, purging check valve 37, pinch valve 27 and balloon check valve 34—are closed.

The empty liquid subsystem B is to be purged. Pressure in gasbag 4 is reduced by series of opening commands for outlet valves 42, and gas is injected into manifold 19 of liquid subsystem B through purging valves 11. Since lock valves 22 and/or pinch valves 27 are closed, gas enters reservoir 7.

Then one of the lock valves 22 or pinch valve 27 opens, pressure in gasbag 4 increases and this way liquid and gas residues are extruded/squeezed from reservoir 7 and from the entire liquid subsystem B.

By alternate opening of lock valves 22 (if installed) of spraying units 8, gas is supplied to manifold 19 through purging valves 11. This way spraying device A dries the liquid subsystem B and the inner space of spraying units 8.

Purging is carried out above the area which was just sprayed during the current session or previous sessions of unmanned vehicle 29 or of a group of unmanned vehicles 29.

Pressure in gasbag 4 is regulated by the session controller 17, continuously calculating sequence of short-term triggerrings of inlet valves 33 and, if necessary, outlet valves 42, taking into account feedback regarding pressure of a liquid in reservoir 7 and/or liquid flow/depletion, and the dynamics of changes of gas pressure in balloon 2, the atmosphere and gasbag 4.

Extraction and Utilization of Liquid Subsystem B

If spraying device A is not integrated into unmanned vehicle 29, it can be first removed from the unmanned vehicle for convenience. Before removing the liquid subsystem an employee takes personal protection measures (puts on gloves and a respirator).

Lock valves 22 of liquid hoses 21 are disconnected from the elements of spraying device A. Liquid hoses 21 are released from housing 1, pinch valve 27 and liquid flow sensor 12.

Lid 38 of basket 6 is opened.

Pressure in gasbag 4 decreases to atmospheric pressure, for this purpose manual outlet valve 65 is used; if necessary, gas residues are removed from gasbag 4 by crumpling it by hand.

If liquid refilling valve 9 is part of the liquid subsystem B, it is disconnected from housing 1.

If complex bag P is used in the spraying device A, then gasbag inlet channel 35 is disconnected from gasbag inlet port 5.

Reservoir 7 or complex bag P is removed from basket 6.

Storage bag 24 is turned inside out and the following are placed into it:
complex bag P or reservoir 7 together with liquid refilling valve 9, if it is part of the liquid subsystem,
manifold 19,
liquid hoses 21.

The filled storage bag is sealed and sent off for utilization.

Since possible liquid residues remain in the entire and hermetic liquid subsystem, the personnel has practically no contact with hazardous liquids.

Self-Diagnosis and Refilling of Spraying Device

Spraying device A should be refilled before the start of a session, and during refilling self-diagnosis is also performed.

Spraying device A must be fixed in a proper position in terms of refilling module 31. For example, this happens automatically, when unmanned vehicle 29 is fixed in a proper position in the landing module of refilling station 41.

Further operations are performed when there is power on the session controller 17:
lock valves 22 of spraying units 8 are closed,
outlet valves 42 are opened and inlet valves 33 are closed,
refilling module 31 is connected to gasbag refilling valve 3 and to liquid refilling valve 9,
refilling module 31 pumps compressed gas into balloon 2, and pressure in balloon 2 and absence of leakage is controlled by the gas balloon pressure sensor 14,
outlet valves 42 are closed and gas feed from balloon 2 to gasbag 4 is controlled up to the test pressure, testing by successive short openings of each inlet valve 33 separately, thus controlling the operable condition of inlet valves 33,
inlet valves 33 are closed and the leakage from gasbag 4 is checked,
pressure is raised in gasbag 4 until purging check valve 37 activates, if complex bag P is used; this way the impermeability of liquid subsystem B and absence of leakage from spraying units 8 are checked,
pressure in liquid subsystem B is increased by short openings of purging valves 11; this way the impermeability of liquid subsystem B and absence of leakage from spraying units 8 are checked, lock valves 22 are opened, gas from liquid subsystem B is vented out to the atmosphere, lock valves 22 are closed, pressure in the gasbag is reduced to atmospheric pressure by successive openings of outlet valves 42; the operable condition of outlet valves 42 is controlled, outlet valves 42 are closed, refilling module 31 refills balloon 2 with gas, refilling module 31 pumps liquid into reservoir 7, pressure in gasbag 4 is raised while simultaneously monitoring the pressure change in reservoir 7; this way the operable condition of liquid subsystem B and the absence of leakage wherein are controlled, if there is leakage, the refilling module 31 begins to receive liquid from reservoir 7 under the pressure of gasbag 4, and practically completely empties reservoir 7; then pressure in gasbag 4 decreases, if critical failure is detected, unmanned vehicle 29 is sent to emergency platform 63 or to storage station 53, where the entire spraying device A is replaced.

Refilling of Refilling Modules with Liquid

The spraying system can be used to deliver liquid (or concentrate thereof) to geographically remote refilling modules. The process of refilling with liquid or concentrate thereof is analogous to regular refilling which is described above. Possible exception is that liquid concentrate can be transported under atmospheric pressure even without a refilled balloon.

After fixing the unmanned vehicle in the landing module of the refilling station-receiver, the refilling module is connected to gas and liquid refilling ports of spraying device. Pressure in the gasbag is raised, therefore its content is squizeed out through the refilling valve into an appropriate liquid source. It is possible to purge liquid residues into an appropriate liquid source.

Such method of the refilling of remote refilling stations is practically eliminating personnel contact with the liquid in field conditions.

Liquid subsystem B of spraying device A of present invention is designed as a single unit. It is compact, hermetic when disconnected from spraying device A, and is utilizable in a sealed storage bag, thus ensuring high level of safety for the personnel. Besides, it is marked with a contactless tag for verifying its authenticity and registering history of its operation, which means the standardization of the main units of the spraying device and assurance of the warranty characteristics of the device.

The proposed technical solution is complex and comprehensive and provides:

Fully automated operation mode.

Automatic monitoring of the operation of main units of the system.

Automatic control of tightness of liquid system using only gas without liquid, which is safe for the personnel and the environment.

Preservation of serviceability for operation in case one or more pressure regulating valves fail (due to the absence of a weak element—single pump).

Possibility to qualitatively dry out the liquid subsystem above the treatment area prior to returning to the refilling station, which contributes to the safety for the personnel.

More accurate positioning of the unmanned vehicle. Liquid is under pressure and as liquid is consumed, the volume of reservoir reduces, and the reservoir itself is pressed to the bottom of the basket. Such a solution does not shift the centre of gravity, and liquid does not splash around and does not swing the unmanned vehicle during its movement.

Replaceable, sealable and marked liquid subsystem, which means:

safety of use, possibility to track the suitability and warranty period of original liquid subsystems, possibility of testing the liquid subsystem during manufacture thereof, uniform quality standard for the elements of liquid subsystem.

Compact form of the liquid subsystem to be utilized, when the liquid subsystem is placed into a storage bag for utilization.

Low weight of the spraying device, as valves are light (from 5 grams), compressed air weighs around 70 grams and it is consumed during spraying.

Low energy consumption. It does not require the significant number of additional batteries or increased capacity thereof. In the activated state valves consume from 0.4 W to 4 W depending on the manufacturer and the speed of operation. With pulse control the average power is below the nominal.

Automated refilling, which means:

avoiding personnel contact with the liquid during refilling, high quality filtration and absence of contaminants in the reservoir, possibility to use prepared—dry and filtered—compressed gas.

Possibility to control liquid supply to each spraying unit separately, which means:

flexibility when forming the spraying session, possibility of temporary operation of the vehicle with one faulty inoperative unit out of several spraying units (for example, if the spraying unit does not open, but it does not have leakage) by automated and dynamic adjustment of the sessions (according to the spraying width).

Possibility to automatically remotely refill the remote refilling modules without participation of personnel, which means that the personnel has practically no contact with the liquid in field conditions.

INDUSTRIAL APPLICABILITY

The proposed complex technical solution can find application both in the field of agriculture, as well as in other industries, where there is need to spray any type of liquid means according to a specified program.

For example, such devices and systems can be used for extinguishing fires, watering of football fields, watering city streets during the hot season, as well as painting, marking or otherwise decorating large-scale objects (for example, buildings) or large areas. Such devices can be used to combat mosquitoes or other spreaders of dangerous diseases, etc.

LIST OF THE POSITIONS OF THE SPRAYING DEVICE AND SYSTEM ELEMENTS

E—spraying system
A—spraying device
B—liquid subsystem
M—chassis
P—complex bag

1—housing of spraying device
2—balloon
3—gasbag refilling valve
4—gasbag
5—gasbag inlet port
6—basket
7—reservoir
8—spraying unit
9—liquid refilling valve
10—pressure regulator
11—purging valve
12—liquid flow sensor or liquid presence detector
13—liquid pressure sensor
14—balloon pressure sensor
15—barometer
16—gasbag pressure sensor
17—session controller
18—reservoir outlet channel
19—manifold
20—manifold channel
21—liquid hoses
22—lock valves
23—contactless tag
24—storage bag
25—storage bag lock
26—elastic section of manifold channel
27—pinch valve
28—measuring section of manifold channel
29—unmanned vehicle
30—static, telescopic or folding trusses or masts
31—refilling module
32—gas refilling valve hose
33—inlet valves
34—balloon check valve
35—gasbag inlet channel
36—spraying device module
37—purging check valve
38—basket lid
39—lock valve actuator
40—sprayer
41—refilling station
42—outlet valves (with actuators)
43—atmosphere port
44—silencer
45—purging port
46—session controller power supply port
47—motion controller
48—combined refilling port
49—control station
50—communication module
52—parking station
53—storage station
54—power supply module
55—ground station control module
56—landing module
57—batteries module
58—batteries
59—unmanned vehicles module
60—stress release leaves
61—compressed gas source
62—liquid source
63—emergency platform
64—communication channel
65—manual outlet valve
66—contactless tag reader
67—unmanned vehicle housing
68—communication with control station unit
69—propulsion system
70—power supply subsystem
71—communication port
72—modular spraying device A

The invention claimed is:

1. A liquid subsystem for use in a spraying device for liquid means of chemical treatment, mounted on an unmanned vehicle, the liquid subsystem comprising:
a reservoir for liquid means of chemical treatment, made in a form of a bag, suitable for extruding liquid therefrom under an external overpressure, wherein the reservoir is provided with an outlet channel, at least one liquid hose connected to the reservoir and a corresponding lock valve,
wherein the liquid subsystem is designed as an entirely replaceable device, further comprising:
a gasbag capable of transferring said external overpressure to the liquid in the reservoir, wherein said external overpressure is adjustable; and
a manifold with one or more outlet ports, which is connected to the outlet channel of the reservoir through a manifold channel,
wherein each liquid hose at one end is hermetically connected to one of the manifold outlet ports, and having its corresponding lock valve at the other end, which is closed in a disconnected state,
wherein a special purging check valve is installed on a common surface shared by the reservoir and the gasbag,
wherein said special purging check valve prevents passing of liquid from the reservoir into the gasbag, and
wherein said special purging check valve allows gas to pass from the gasbag into the reservoir if gas pressure in the gasbag exceeds a pressure of the liquid in the reservoir by a certain threshold value.

2. The liquid subsystem according to claim 1, further comprising:
a sealable storage bag, in which the liquid subsystem is supplied and utilized after use; and
a contactless tag, made as a barcode, a two-dimensional code or a radio frequency tag, wherein the contactless tag contains at least one of the following:
read-only information comprising a unique identifier of the liquid subsystem, a date of manufacture, a warranty expiry date, a designation of compatibility with various liquids, a designation of maximum operating pressure, a number of provisional cycles of use, or a combination thereof; and
variable indicators comprising one or more of an identifier of the used liquid type, an impermeability status of the liquid subsystem, a counter for the cycles of use, or a combination thereof.

3. The liquid subsystem according to claim 1, wherein the manifold channel is elastic or is provided with an elastic section for being clamped by an outer pinch valve,
wherein the manifold channel is provided with one or more measuring sections for being placed into outer liquid flow sensor(s) and/or liquid presence detector(s), and
wherein any of said liquid flow sensor(s) and/or liquid presence detector(s), into which said one or more measuring sections is placed, is ultrasonic, optical, inductive or capacitive.

4. The liquid subsystem according to claim 1, wherein said gasbag is provided with a gas inlet channel to be filled with compressed gas and is capable of transferring a gas pressure in the gasbag to the liquid in the reservoir.

5. The liquid subsystem according to claim 1, wherein said gasbag is made conjoint with the reservoir to form a joint complex bag, made of a material impermeable for a liquid media, and wherein said joint complex bag is made as a double bag, wherein an inner bag is embedded into an outer bag, and where the inner bag is the reservoir, wherein the outer bag is the gasbag, or
wherein said complex bag is made of three layers of materials, which are hermetically sealed together around a periphery thereof, where a lower bag is the reservoir and an upper bag is the gasbag.

6. A spraying device for liquid means of chemical treatment, mounted on an unmanned vehicle and comprising a housing, a reservoir for liquid means, spraying unit(s) with sprayer(s), spraying device controller, liquid transport system with a set of hoses, and means for transporting of liquid through the liquid transport system from the reservoir to the spraying unit(s),
wherein the reservoir and the liquid transport system are made in the form of one or more entirely replaceable liquid subsystems as defined in claim 1;
wherein the means for transporting of liquid from the reservoir to the spraying unit(s) are compressed gas, contained in one or more balloons and which is fed into the gasbag, equipped with a gasbag inlet channel, wherein the gasbag, being part of the liquid subsystem, is embedded into a basket together with the reservoir of the liquid subsystem and is capable of transferring overpressure thereof to the liquid in the reservoir;
wherein the spraying device further comprises a pressure regulator, providing adjustable gas supply from the one or more balloon(s) to the gasbag;
wherein each spraying unit is connected with an appropriate liquid hose of the liquid subsystem through the hermetic connection port of the corresponding lock valve of the liquid hose;
wherein the spraying device controller is a session controller, which is designed to control the pressure regulator, taking into account readings of feedback sensors,
wherein the spraying device is equipped with one or more communication channel(s) over which the session controller interacts with a motion controller of the unmanned vehicle; and
wherein the spraying device is equipped with a contactless reader of a contactless tag of the liquid subsystem, wherein said contactless reader is connected to the session controller.

7. The spraying device according to claim 6, wherein the spraying device is provided with one or more liquid refilling valves, each liquid refilling valve being connected to an appropriate liquid hose of the liquid subsystem and which is designed for refilling the liquid subsystem with liquid means of chemical treatment, or
wherein the spraying device is provided with one or more gasbag refilling valves designed for refilling the balloon(s) with compressed gas.

8. The spraying device according to claim 7, wherein the spraying device is equipped with one or more combined refilling ports, each combined refilling port combining one gasbag refilling valve and one liquid refilling valve,
wherein the combined refilling port is designed for automated refilling and/or emptying of the spraying device.

9. The spraying device according to claim 6, wherein said pressure regulator is provided with:
one or more inlet valves, connecting the balloon with the gasbag inlet port; and
one or more outlet valves, connecting the gasbag inlet port with an atmosphere,
wherein one of the outlet valves is a manual outlet valve for use when replacing the liquid subsystem.

10. The spraying device according to claim 6, wherein the spraying device is equipped with a central pinch valve, and
wherein the spraying device is equipped with one or more purging valves, which are designed for passing gas from the balloon(s) into the liquid subsystem in order to purge and dry it, and which are connected to the corresponding liquid hoses of the liquid subsystem.

11. The spraying device according to claim 6, wherein each spraying unit is provided with a lock valve actuator, wherein any spraying unit comprises one or more sprayer(s), said one or more sprayer(s) of any spraying unit being of siphon, centrifugal or disk type, an airless type nozzle or an air-assisted nozzle.

12. The spraying device according to claim 6, wherein the feedback sensors comprise at least sensor(s) of liquid pressure in the reservoir, and
wherein the feedback sensors further comprise a liquid flow sensor(s), and/or liquid presence detector(s), and/or balloon pressure sensor(s), and/or gasbag pressure sensor(s), and/or barometer(s).

13. The spraying device according to claim 6, wherein the session controller is a microprocessor based device designed to regulate pressure of a liquid in the reservoir according to a continuously calculated sequence of short-term triggerings of inlet and outlet valves and/or designed to check the hermetic state and/or operability of main nodes of the spraying device.

14. The spraying device according to claim 13, wherein the unmanned vehicle is designed to serve as an energy source for the session controller, which is able to further serve for powering other elements of the spraying device.

15. The spraying device according to claim 6, wherein a housing or frame of the unmanned vehicle is designed to serve as the housing of the spraying device, and wherein the entire housing of the spraying device or part thereof is designed to serve as the basket equipped with a hinged or removable lid, wherein said housing comprises trusses/masts onto which spraying units are installed, wherein the trusses/masts are made static, telescopic or foldable.

16. The spraying device according to claim 6, wherein the spraying device is made in the form of a module designed for automated installation, removal or replacement on an unmanned vehicle.

17. A spraying system of liquid means of chemical treatment, comprising one or more unmanned vehicles with mounted spraying device(s), a complex of one or more ground stations for automated refilling of spraying device(s), mounted on an unmanned vehicle, and a control station, controlling said complex of one or more ground stations and motion of unmanned vehicle(s),
wherein said spraying device, mounted on an unmanned vehicle of the spraying system is a spraying device as defined in claim 6;
wherein any unmanned vehicle is equipped with one or more said spraying devices;
wherein said complex of ground stations comprises a station(s) equipped at least with:
a landing module, designed for reliable positioning therein of an unpowered unmanned vehicle(s), and
a refilling module, which is connected to a compressed gas source and a liquid source, and which is designed for automated refilling of said spraying device, mounted on an unmanned vehicle, located in the landing module, with both compressed gas and sprayable liquid by connecting to a gasbag refilling valve and a liquid refilling valve.

18. The spraying system according to claim 17, wherein the refilling module is connected to one or more liquid sources, and is designed to be able to empty the reservoir of the connected spraying device into one of said liquid sources, wherein any liquid source connected to the refilling module is either stationary or mobile.

19. The spraying system according to claim 17, wherein the one or more ground stations are of a modular design, and, besides said landing and refilling modules, a set of modules further comprises at least:
   a power supply module, designed to supply power to other station modules;
   a ground station control module, designed to be able to contact with the control station and unmanned vehicles by a communication module;
   a spraying device module, designed for automated installation, dismantling and replacement of spraying device on an unmanned vehicle(s) and for storage of spraying devices; and
   a chassis, designed for installation of ground station modules thereon.

20. The spraying system according to claim 17, wherein said unmanned vehicle is an unmanned aerial vehicle.

* * * * *